United States Patent
Cheung et al.

(10) Patent No.: US 10,101,490 B2
(45) Date of Patent: *Oct. 16, 2018

(54) METHODS AND SYSTEMS FOR OBTAINING AN ELECTRICAL IMPEDIVITY AND/OR RESISTIVITY IMAGE OF A SUBTERRANEAN FORMATION

(71) Applicant: Schlumberger Technology Corporation, Houston, TX (US)

(72) Inventors: Philip S. Cheung, Wadhurst (GB); Tianhua Zhang, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/345,568

(22) Filed: Nov. 8, 2016

(65) Prior Publication Data

US 2017/0075022 A1    Mar. 16, 2017

Related U.S. Application Data

(63) Continuation of application No. 14/367,226, filed as application No. PCT/US2012/071120 on Dec. 21, 2012, now Pat. No. 9,513,399.

(30) Foreign Application Priority Data

Dec. 26, 2011  (EP) ..................... 11290615

(51) Int. Cl.
    *G01V 3/20*  (2006.01)
    *G01V 3/24*  (2006.01)
    (Continued)

(52) U.S. Cl.
    CPC ............... *G01V 3/20* (2013.01); *G01V 3/24* (2013.01); *G01V 3/26* (2013.01); *G01V 3/38* (2013.01)

(58) Field of Classification Search
    None
    See application file for complete search history.

(56) References Cited

U.S. PATENT DOCUMENTS

| 6,272,232 B1 | 8/2001 | Delhomme et al. |
| 7,066,282 B2 | 6/2006 | Chen et al. |
| (Continued) | | |

FOREIGN PATENT DOCUMENTS

| EP | 2182391 A1 | 5/2010 |
| EP | 2639602 A1 | 9/2013 |
| WO | WO2007070777 A2 | 6/2007 |

OTHER PUBLICATIONS

International Search report and Written Opinion received in the related PCT application PCT/US2012/071120, dated Mar. 18, 2013 (10 pages).

(Continued)

*Primary Examiner* — Jermele M Hollington
*Assistant Examiner* — Douglas X Rodriguez
(74) *Attorney, Agent, or Firm* — Michael Dae

(57) ABSTRACT

Methods and systems for obtaining an electrical impedivity and/or resistivity image of a subterranean formation are provided. The electrical impedivity and/or resistivity image can be obtained by determining first formation impedivity data and second formation impedivity data. The first formation impedivity data can be based on a component of the measured impedance data orthogonal a downhole fluid impedance. The second formation impedivity data can be based on an amplitude of the measured impedance data. A combined formation impedivity data can be obtained by combining a portion of the first formation impedivity data based on a first formation impedivity determination process with a portion of the second formation impedivity data based on a second formation impedivity determination process. The electrical impedivity and/or resistivity image of the (Continued)

subterranean formation can then be obtained by using the combined formation impedivity data.

16 Claims, 11 Drawing Sheets

(51) Int. Cl.
*G01V 3/26* (2006.01)
*G01V 3/38* (2006.01)

(56) References Cited

U.S. PATENT DOCUMENTS

| | | |
|---|---|---|
| 2008/0071709 A1* | 3/2008 | Strack ................. G01V 3/083 706/20 |
| 2008/0272789 A1 | 11/2008 | San Martin et al. |
| 2009/0029471 A1 | 1/2009 | Palacios-Boyce |
| 2009/0259403 A1 | 10/2009 | Akbar |
| 2010/0019771 A1 | 1/2010 | Gold et al. |
| 2010/0039115 A1 | 2/2010 | Bespalov et al. |
| 2011/0114309 A1 | 5/2011 | Bloemenkamp et al. |
| 2011/0241689 A1 | 10/2011 | Hayman |

OTHER PUBLICATIONS

International Preliminary Report on Patentability issued in the related PCT application PCT/US2012/071120, dated Jul. 1, 2014 (5 pages).
Extended Search report issued in the related EP application 11290615.1, dated May 31, 2012 (6 pages).
Office action received in the related MX application MX/a/2014/007817, dated Sep. 22, 2015 (4 pages).

\* cited by examiner

METHODS AND SYSTEMS FOR OBTAINING AN ELECTRICAL IMPEDIVITY AND/OR RESISTIVITY IMAGE OF A SUBTERRANEAN FORMATION

CROSS-REFERENCE TO RELATED APPLICATIONS

The current application is a continuation application of, and claims the benefit of, U.S. application Ser. No. 14/367,226, filed on Jun. 19, 2014, titled: "Methods and Systems for Obtaining an Electrical Impedivity and/or Resistivity Image of a Subterranean Formation", which is a national phase application of PCT/US2012/071120, filed on Dec. 21, 2012, titled: "Methods and Systems for Obtaining an Electrical Impedivity and/or Resistivity Image of a Subterranean Formation" which in turn claims the benefit of European Patent Application 11290615.1 filed on Dec. 26, 2011, titled: "Methods and Systems for Obtaining an Electrical Impedivity and/or Resistivity Image of a Subterranean Formation", the entire contents of which are incorporated by reference into the current application.

BACKGROUND

For oilfield and hydrocarbon exploration it can be particularly useful to have a tool that is capable of scanning a subterranean formation and to convey data representing the various strata and hydrocarbons that constitute a subterranean formation. Specifically, after drilling a borehole down into the subterranean formation, it can be useful to have downhole tools that are capable of being run along the borehole wall and scanning the surrounding formation to provide an image of the formation's properties to a user on the surface. Equally, it can be useful to have such a tool mounting on or close to a drill tip so that the formation can be imaged as the drill penetrates into the subterranean formation. This can enable a user to measure and/or image various formation parameters close to or ahead of the drill bit and from there get the latest information about the downhole formation, which might impact on the direction being drilled.

SUMMARY

This disclosure is directed to methods and systems for obtaining an electrical impedivity and/or resistivity image of a subterranean formation.

In particular, embodiments are provided herein for obtaining a single electrical impedivity and/or resistivity image for subterranean formation resistivities between, for example, ~0.2 Ωm to ~10,000 Ωm based on a composite of two or more images that: a) varies monotonically with formation resistivity $\rho_f$; b) suppresses rugosity effects; and c) can be computed with minimal user input and within a short period of time (e.g., within one hour from taking measurements in the borehole).

In one embodiment, method for obtaining a composite image of a subterranean formation is provided. The method includes measuring impedance data within a subterranean formation. The method also includes determining first formation impedivity data by performing a first formation impedivity determination process. Also, the method includes, determining second formation impedivity data by performing a second formation impedivity determination process. Further, the method includes combining a portion of the first formation impedivity data with a portion of the second formation impedivity data to determine combined formation impedivity data. Moreover, the method includes generating the composite image using the combined formation impedivity data.

In another embodiment, a system for obtaining a composite image of a subterranean formation is provided. The system includes a tool for investigating a subterranean formation, a measurement unit disposed on the tool, and a processor connected to the measurement unit. The measurement unit is adapted to measure impedance data from the subterranean formation. The processor includes components adapted to: perform a first formation impedivity determination process to determine first formation impedivity data; perform a second formation impedivity determination process to determine second formation impedivity data; combine a portion of the first formation impedivity data with a portion of the second formation impedivity data to determine combined formation impedivity data; and generate the composite image of the subterranean formation using the combined formation impedivity data.

This summary is provided to introduce a selection of concepts that are further described below in the detailed description. This summary is not intended to identify key or essential features of the claimed subject matter, nor is it intended to be used as an aid in limiting the scope of the claimed subject matter.

DRAWINGS

DETAILED DESCRIPTION

The embodiments provided herein are directed to methods and systems for obtaining an electrical impedivity and/or resistivity image of a subterranean formation.

Specific details are given in the following description to provide a thorough understanding of the embodiments. However, it will be understood by one of ordinary skill in the art that the embodiments may be practiced without these specific details. For example, units, systems, methods, and other components may be shown as components in block diagram form in order not to obscure the embodiments in unnecessary detail. In other instances, well-known units, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc.

The embodiments provided herein include methods and systems for obtaining an electrical impedivity and/or resistivity image of a subterranean formation. In particular, embodiments are provided herein obtaining a single electrical impedivity and/or resistivity image for subterranean formation resistivities between about 0.2 Ωm to about 10,000 Ωm based on a composite of two or more images that: a) varies monotonically with formation resistivity $\rho_f$; b) suppresses rugosity effects; and c) can be computed with minimal user input and within a short period of time (e.g., within one hour from taking measurements in the borehole).

Figure 1:
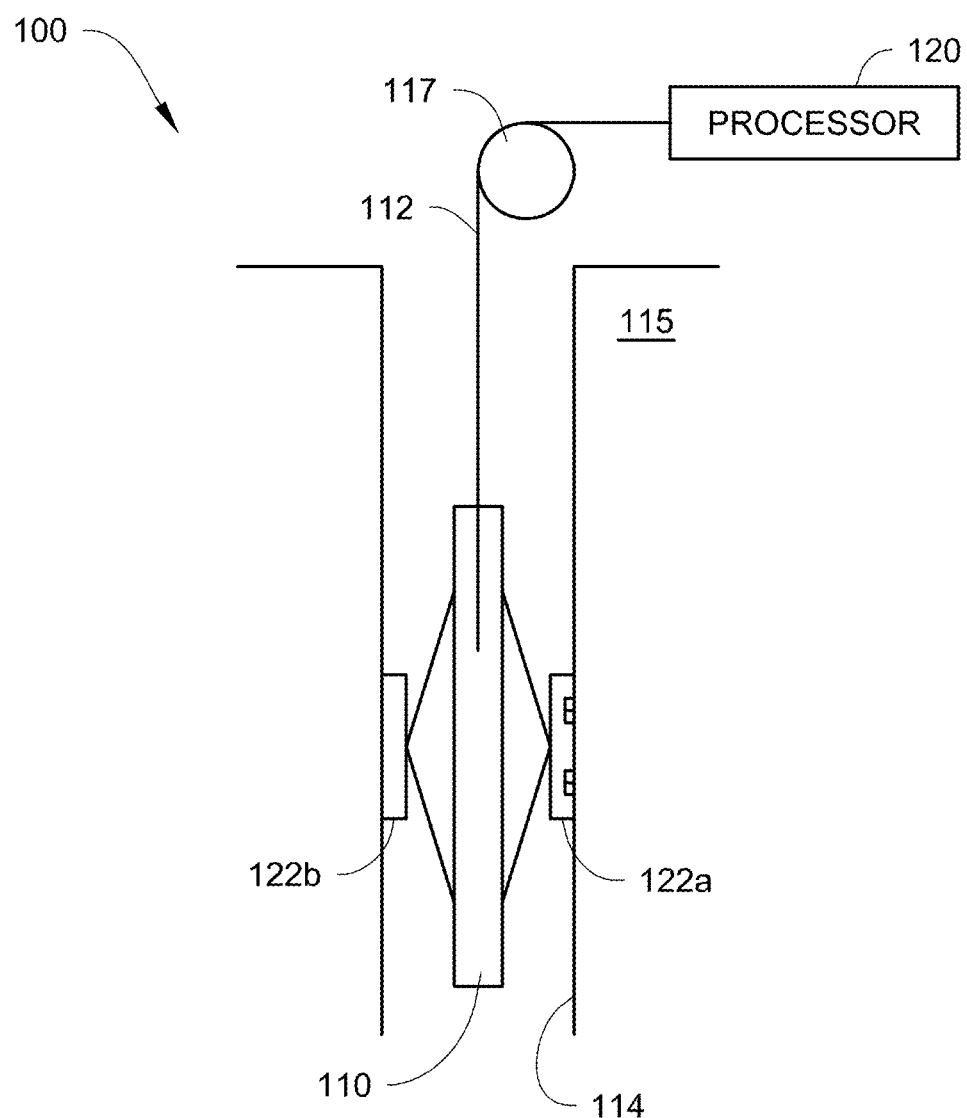
FIG. 1 is a block diagram of a system for obtaining a composite image of a subterranean formation.

FIG. 1 is a block diagram of a system 100 for obtaining a composite image (e.g., an electrical impedivity and/or resistivity image) of a subterranean formation. The system 100 includes a tool 110 which is suspended via a cable 112 in a borehole 114 which traverses a subterranean formation 115. The cable 112 is wound about a winch 117 or a suitable suspension unit located at the surface of the earth formation, and may be utilized, if desired, to carry information which is sent by the tool 110 to a processor 120. The tool 110 is shown with pads 122a, 122b, each of which may include one or more measurement units (not shown) for measuring impedance data. In other embodiments, the tool 110 may include a single pad or more than two pads. Information is gathered by the tool 110 by use of one or more electrodes located on the pads 122a, 122b. The gathered information may be preprocessed downhole by a processing unit (not shown) associated with the tool 110 and may be sent via the cable 112, or via wireless mechanisms for additional uphole processing. The uphole processing may be located in the vicinity of the subterranean formation 115 or at another site as desired. In some embodiments, raw data may be sent uphole.

In some embodiments, the tool 100 is a Measurement-While-Drilling/Logging-While-Drilling (LWD) tool. However, it will be appreciated that other downhole tools such as a wireline tool, coiled tubing tool, testing tool, production tool and the like may also be used with the methods and systems described herein.

Figure 2A:
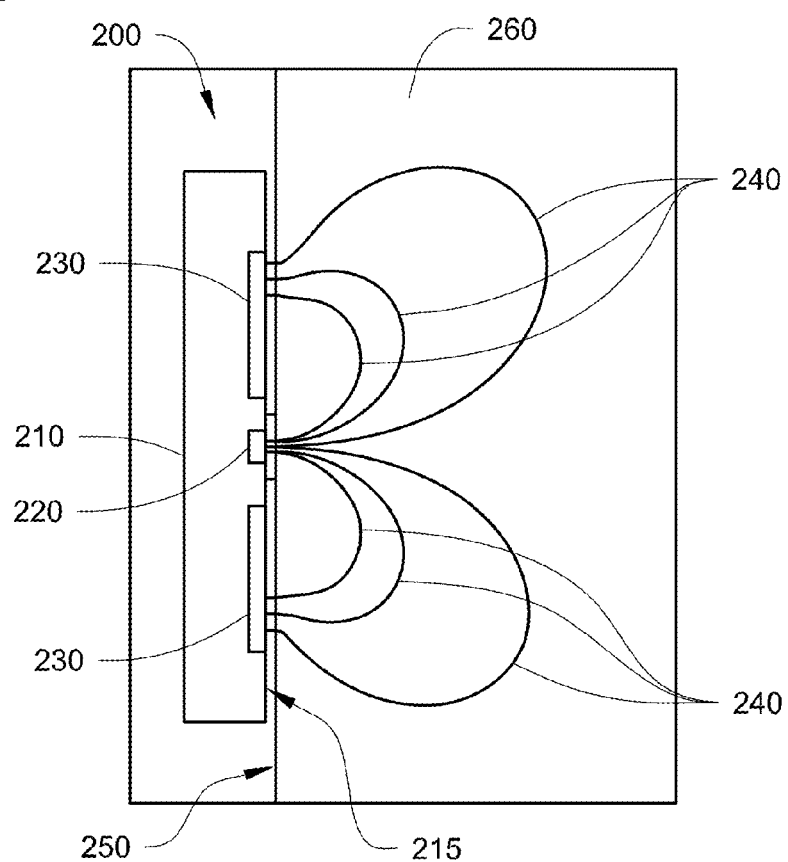
FIG. 2A is a side view of a measurement unit for measuring impedance data of a subterranean formation.
Figure 2B:
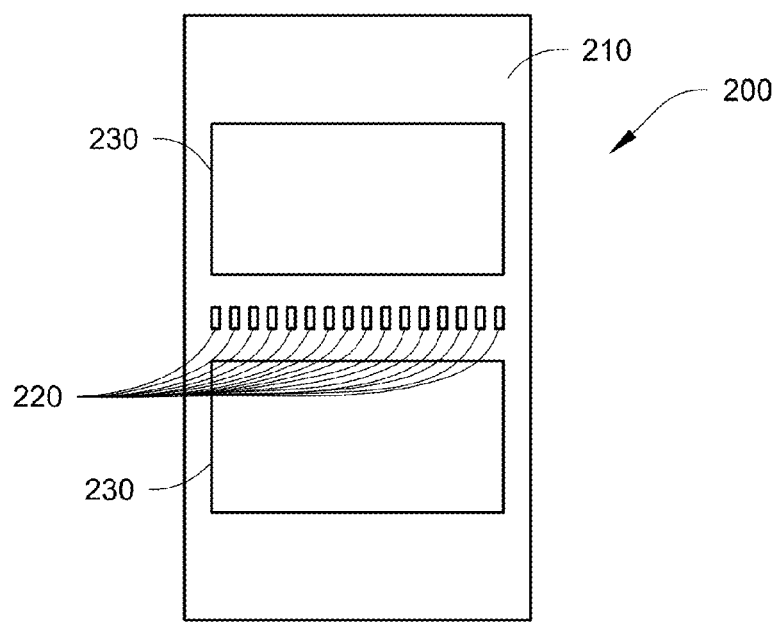
FIG. 2B is a front view of a measurement unit for measuring impedance data of a subterranean formation.

FIG. 2A is a side view of a measurement unit 200 that may be located on a tool, such as the tool 110 shown in FIG. 1. The measurement unit 200 can include a pad 210 having an array of button electrodes 220 and two return electrodes 230. FIG. 2B is a front view of the pad 210 showing the array of button electrodes 220. The pad 210 in FIG. 2B can include 16 button electrodes 220. In other embodiments, the number of button electrodes 220 can vary, for example, between 10 and 40.

In one embodiment, a voltage V at the frequency ω is applied between the button electrodes 220 and the return electrodes 230. The voltage V creates currents that flow along the paths 240 from the button electrodes 220 through a downhole fluid (not shown), between a face 215 of the pad 210 and a borehole wall 250, into a subterranean formation 260 and back through the borehole wall 250, through the downhole fluid and to the return electrodes 230. In some embodiments, the downhole fluid can be a non-conductive downhole fluid (e.g., oil based mud, etc.). A current $I_B$ is measured at each of the button electrodes 220. As the measurement unit 200 travels through a borehole, the current $I_B$ can be measured and stored for processing by a processer, such as the processor 120 shown in FIG. 1.

With the current $I_B$ measurements from different positions within the borehole, an impedance $Z_B(\omega)$ may be calculated using the equation:

$$Z_B(\omega) = V/I_B$$

where $Z_B(\omega)$ is the complex impedance seen by the button electrodes 220, which may be measured in terms of its amplitude $|Z_B|$ and phase $\phi_B$, or equivalently, its real and imaginary parts, The impedance $Z_B(\omega)$ can be approximated by the equation (1):

$$Z_B(\omega) = Z_F(\omega) + Z_M(\omega)$$

where $Z_M(\omega)$ is the complex impedance of the part of the current path in the downhole fluid and $Z_F(\omega)$ is the complex impedance of the part of the current path in the subterranean formation.

Further, approximations can be made that to obtain the following equations:

$$Z_F(\omega) = k_F \zeta_F(\omega)$$

$$Z_M(\omega) = Sk_M \zeta_M(\omega)$$

where $k_M$, $k_F$ are geometric factors for the downhole fluid and subterranean formation terms, respectively and are constant real values. The geometric factors $k_M$, $k_F$ can be obtained, for example, by laboratory measurements made on a physical example of the measurement unit, or by using a mathematical modelling process. Also, $\zeta_F$ is the frequency dependant complex impedivity of the subterranean formation, $\zeta_M$ is the frequency dependant complex impedivity of the downhole fluid, and S is the standoff (e.g., the thickness of the downhole fluid between a face of the measurement unit and borehole wall). By determining the $\zeta_F(\omega)$ at different frequencies, electrical impedivity and/or resistivity images of a subterranean formation can be obtained.

By definition, the impedivity $\zeta$ of a material can be related to its resistivity $\rho$, its relative permittivity $\varepsilon$ and its frequency $\omega (= 2\pi f)$ by the equation:

$$\zeta(\omega) = 1/(\rho^{-1} + j\varepsilon\varepsilon_o\omega) = \rho/(1 + j\varepsilon\varepsilon_o\omega)$$

where $\varepsilon_o$ is the permittivity of free space. Accordingly:

when the resistivity is low (such that $\rho\varepsilon\varepsilon_o\omega \ll 1$, e.g., when the resistivity $<\sim 50$ Ωm at a frequency of $\sim 5$ MHz, or when the resistivity $<\sim 5$ Ωm at a frequency of about $\sim 50$ MHz) $|\zeta| \to \rho$ when the resistivity is high (such that $\rho\varepsilon\varepsilon_o\omega \gg 1$, e.g., when the resistivity $>\sim 1000$ Ωm at a frequency of $\sim 5$ MHz, or when the resistivity $>\sim 100$ Ωm at a frequency of $\sim 50$ MHz), $|\zeta| \to 1/\varepsilon\varepsilon_o\omega$.

Also, at high resistivities (such that $\rho\varepsilon\varepsilon_o\omega \gg 1$, e.g., when the resistivity $>\sim 1000$ Ωm at a frequency of $\sim 5$ MHz, or when the resistivity $>\sim 100$ Ωm at a frequency of $\sim 50$ MHz), the impedivity can be much lower than the resistivity. For example, the impedivity of a subterranean formation with a resistivity of $\sim 10,000$ Ωm can be $\sim 1000$ Ωm at a frequency of $\sim 5$ MHz, and can be $\sim 100$ Ωm at a frequency of $\sim 50$ MHZ.

Since non-conductive downhole fluid can effectively operate as an insulator ($\rho\varepsilon\varepsilon_o\omega \gg 1$), an effective way to decrease $\zeta_M$ can be to increase the frequency. In particular, the frequency can be increased in order to avoid $|Z_F|/|Z_M| \ll 1$.

However, sensitivity to the formation resistivity can be lost at high resistivities if the frequency is too high. Accordingly, loss of sensitivity to the formation resistivity can be avoided if $|\zeta_F|/\rho_F \ll 1$.

As resistivities of a subterranean formation can vary in a range of $\sim 0.2$ Ωm to $\sim 10,000$ Ωm, it can be difficult to find a single frequency that is suitable for subterranean formation resistivities and still satisfy $|\zeta_F|/\rho_F \ll 1$ and $|Z_F|/|Z_M| \ll 1$. Thus, by combining $\zeta_F$ data obtained at different frequencies an accurate electrical impedivity and/or resistivity image of a subterranean formation can be obtained for a range of resistivities from $\sim 0.2$ Ωm to $\sim 10,000$ Ωm.

At low formation resistivities (e.g., when the resistivity $<\sim 50$ Ωm at a frequency of $\sim 5$ MHz, or when the resistivity $<\sim 5$ Ωm at a frequency of $\sim 50$ MHz), when $|Z_F| \sim \rho_F$, an accurate $\rho_F$ (e.g., at least within ±20%) can be obtained if $|Z_F|/|Z_M| > 1/10$. Likewise, at high formation resistivities (e.g., e.g., when the resistivity $>\sim 1,000$ Ωm at a frequency of $\sim 5$ MHz, or when the resistivity $>\sim 100$ Ωm at a frequency of $\sim 50$ MHz), when $|\zeta_F| \sim |Z_B|/k_F$, an accurate $\rho_F$ (e.g., at least within ±20%) can be obtained when $|\zeta_F|/\rho_F > 1/10$.

The subterranean formation impedance $Z_F(\omega)$ may be calculated by removing or reducing the effect of the impedance $Z_M(\omega)$ associated with the downhole fluid from the above equation (1). As discussed in more detail below, there are several methods for removing the effect of the impedance $Z_M(\omega)$ associated with the downhole fluid at different resistivities.

Figure 3:
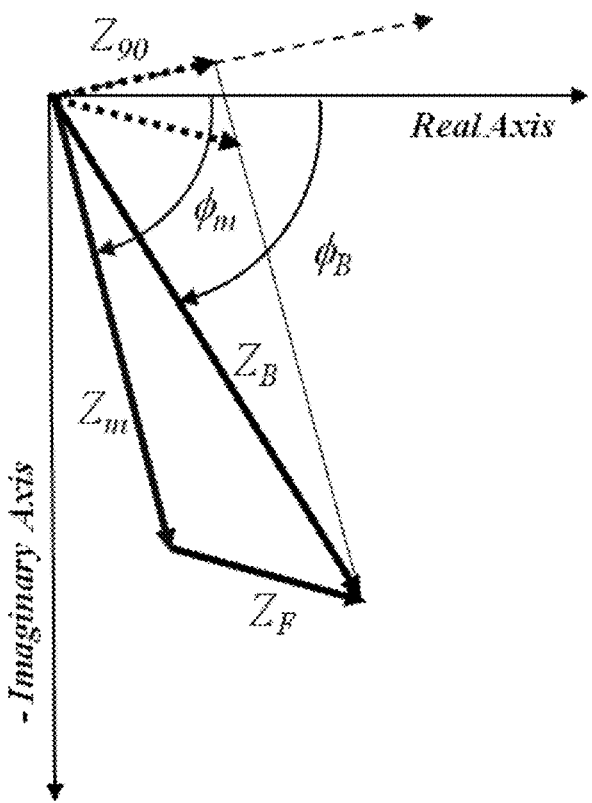
FIG. 3 is a chart illustrating the orthogonal component of a button impedance.
Figure 4:
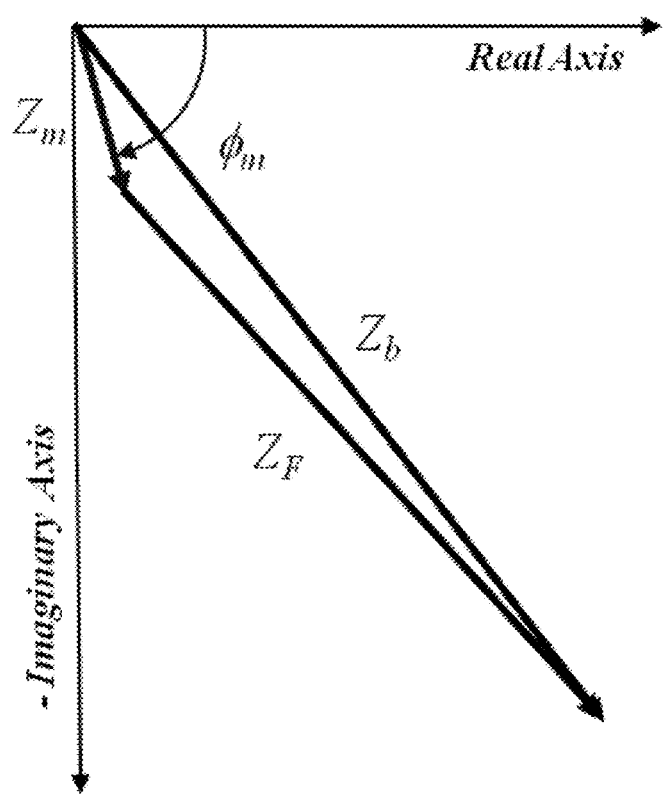
FIG. 4 is a chart illustrating the amplitude of a button impedance.

FIGS. 3 and 4 show $Z_M$ and $Z_F$ and $Z_B$ in the complex plane. FIG. 3 is a chart showing $Z_M$ and $Z_F$ and $Z_B$ at low formation resistivities. It has been found, at low resistivities, $Z_M Z_F$. As shown in FIG. 3, an orthogonal component of $Z_B$ (also referred to herein as "$Z_{90}$"), which is the component of $Z_B$ that is at 90° to $Z_M$, remains unchanged as $Z_M$ varies. In fact, FIG. 3 shows that $Z_{90}$, is related to $Z_F$ by:

$$Z_{90}=|Z_F|\sin(\phi_F-\phi_M)$$

where the $\phi$'s are defined by $\tan\phi=-1/(\varepsilon\varepsilon_o\omega\rho)$. As non-conductive based downhole fluid can be considered as a pure insulator, $\phi_M$ can be close to $\sim 90°$ (e.g., $\sim 80°$). Thus, when formation resistivity is low, the formation can be close to a pure resistance and $|\phi_F|$ can be small (e.g., $|\phi_F|<20°$). So, at low formation resistivities, $Z_{90}$ can be close to $|Z_F|$ and images of $Z_{90}$ can provide accurate images of formation impedivity.

The orthogonal component $Z_{90}$ can be computed directly as:

$$Z_{90}=|Z_B|\sin(\phi_B-\phi_M)$$

where $|Z_B|$ and $\phi_B$ are measured and $\phi_M$ can be obtained using methods known in the art such as by measuring $\phi_M$ by a 'downhole button' on a tool, such as the tool 100 shown in FIG. 1, or by estimating $\phi_M$ from the $Z_B$ measurements themselves.

FIG. 4 is a chart showing $Z_M$ and $Z_F$ and $Z_B$ at high formation resistivities. As shown, at sufficiently high resistivities or sufficiently low standoff, $Z_M \ll Z_F$. As long as $Z_M \ll Z_F$, an amplitude of $Z_B$ ($|Z_B|$) Can approach the amplitude of $Z_F$ ($|Z_F|$). In such cases, images of $|Z_B|$ can provide an accurate image of formation impedivity.

Figure 5:
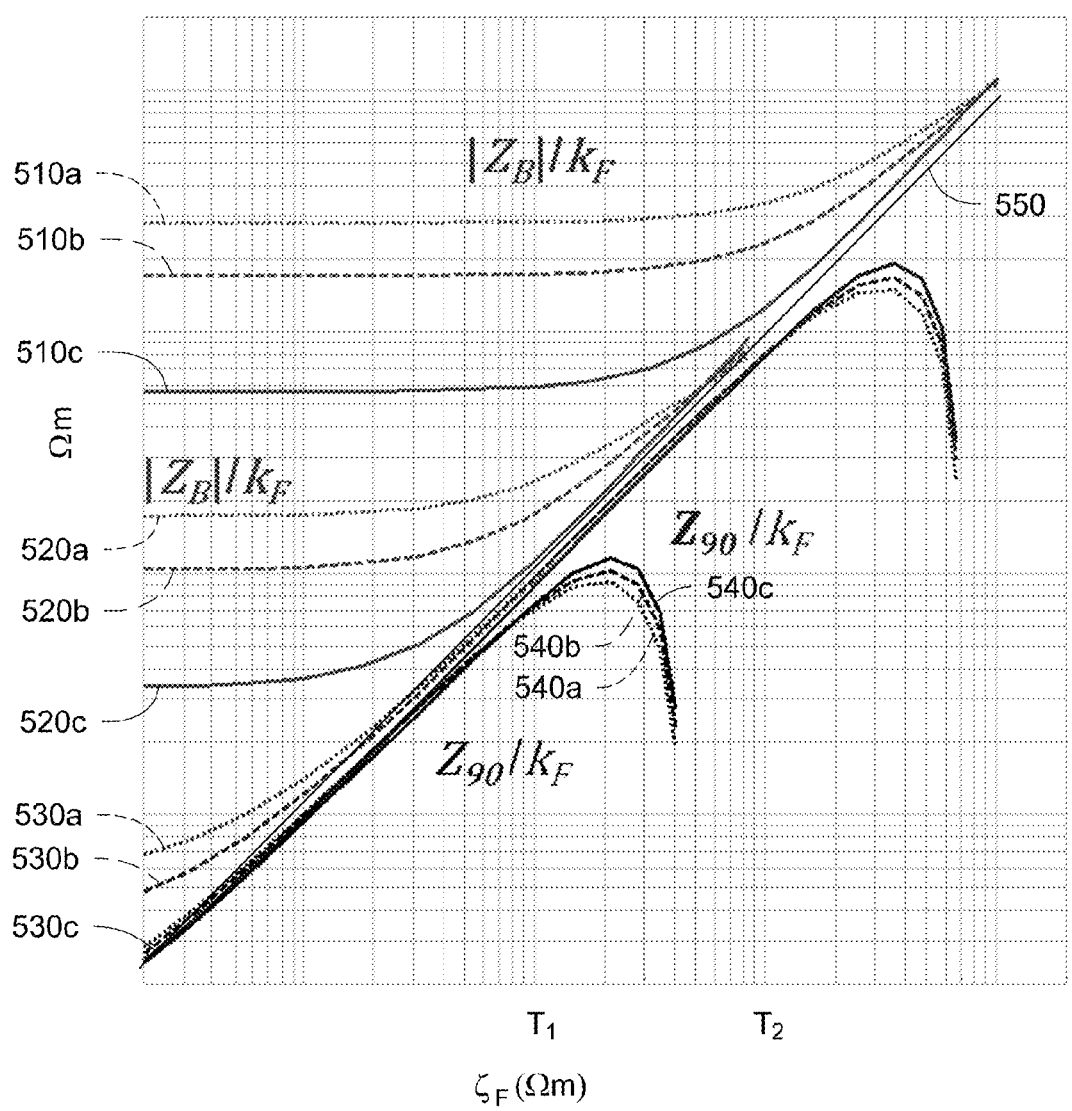
FIG. 5 is a chart illustrating first impedivity data and second impedivity data obtained at different frequencies and at different standoff distances.

FIG. 5 is a chart illustrating $|Z_B|/k_F$ curves and $Z_{90}/k_F$ curves against $|\zeta_F|$ at different standoff distances $S_1$, $S_2$ and $S_3$ (where $S_1$ is larger than $S_2$ and $S_3$ and $S_2$ is larger than $S_3$). It is noted that FIG. 5 can be computed for a specific subterranean formation model and downhole fluid properties. Details, such as the $|\zeta_F|$ values where the $Z_{90}/k_F$ curves begin to decrease as the $|\zeta_F|$ values increase, can be different from borehole to borehole as subterranean formation and downhole fluid properties change.

In particular, FIG. 5 includes $|Z_B|/k_F$ curves 510*a-c* at a low frequency (e.g., below $\sim 1$ MHz) and at standoff distances $S_1$, $S_2$ and $S_3$, respectively. FIG. 5 also includes $|Z_B|/k_F$ curves 520*a-c* at a high frequency (e.g., above $\sim 1$ MHz, and in some embodiments above $\sim 50$ MHz) and at standoff distances $S_1$, $S_2$ and $S_3$. Similarly, FIG. 5 includes $Z_{90}/k_F$ curves 530*a-c* at the low frequency and at standoff distances $S_1$, $S_2$ and $S_3$, respectively, and $Z_{90}/k_F$ curves 540*a-c* at the high frequency and at standoff distances $S_1$, $S_2$ and $S_3$. In one embodiment, the standoff distance $S_1$ can be, for example, $\sim 5$ mm, the standoff distance $S_2$ can be, for example, $\sim 3$ mm and the standoff distance $S_3$ can be, for example, $\sim 1$ mm.

As shown in FIG. 5, the $Z_{90}/k_F$ curves 530*a-c* and 540*a-c* can give $|\zeta_F|$ at low $|\zeta_F|$ values (e.g., below $\sim 10$ Ωm), where $|\zeta_F|$ is effectively $\rho_F$. Standoff can have a very weak influence on these curves as the curves 530*a-c* and 540*a-c* are very close to each other. Also, the $|Z_B|/k_F$ curves 510*a-c* and 520*a-c* can give $|\zeta_F|$ at high $|\zeta_F|$ values (e.g., above $\sim 100$ Ωm).

Further, the high frequency $Z_{90}/k_F$ curves 540*a-c* can provide $\zeta_F$ values closer to $\rho_F$ and with less influence of standoff, for $\zeta_F$ values up to $\sim T_1$. The low frequency $Z_{90}/k_F$ curves 530*a-c* can provide $\zeta F$ values closer to $\rho_F$ for $\zeta_F$ values from $\sim T_1$ to $\sim T_2$. Also, both sets of $Z_{90}/k_F$ curves 530*a-c* and 540*a-c* can 'turn over' after reaching a maximum and decrease to negative values (not shown). Thus, the $Z_{90}/k_F$ curves 530*a-c* and 540*a-c* can be combined to provide an accurate (e.g., within 20%) $\rho_F$ measurement of $\zeta_F$ values up to $\sim T_2$.

The effect of standoff can be seen on the $|Z_B|/k_F$ curves 510*a-c* and 520*a-c* in that as $|\zeta_F|$ values decrease, the curves 510*a-c* and 520*a-c* quickly diverge from a $|Z_B|/k_F=|\zeta_F|$ trend line 550. The higher the standoff, the earlier the divergence can take place. At low $|\zeta_F|$ values (e.g., below $\sim 10$ Ωm), the $|Z_B|/k_F$ curves 510*a-c* and 520*a-c* can asymptote to the values proportional to standoff. These asymptotic values can correspond to $|Z_M|/k_F$ (also referred to herein as "the downhole fluid correction term") at the standoffs. Accordingly, if the asymptotic values are subtracted from the curves 510*a-c* and 520*a-c*, the resulting curves can converge on the $|Z_B|/k_F=|\zeta_F|$ trend line 550. In particular, the $|Z_B|/k_F$ curves 510*a-c* and 520*a-c*, when corrected by subtracting out the downhole fluid correction term $|Z_M|/k_F$, can provide an accurate measurement (e.g., within 20%) of $|\zeta_F|$ for $\zeta_F$ values beyond $\sim T_2$ up to, e.g., $\sim 10,000$ Ωm. As discussed in more detail below, the downhole fluid correction term $|Z_M|/k_F$, can be calculated using a correlation process and/or an inversion process. Thus, the corrected $|Z_B|/k_F$ curves 510*a-c* and 520*a-c*, when corrected by subtracting out the downhole fluid correction term $|Z_M|/k_F$, in combination with the $Z_{90}/k_F$ curves 530*a-c* and 540*a-c*, can provide an accurate measurement (e.g., within 20%) of $|\zeta_F|$ for an entire range of resistivities in the subterranean formation (e.g., between ~0.2 Ωm and ~10,000 Ωm).

Figure 6:
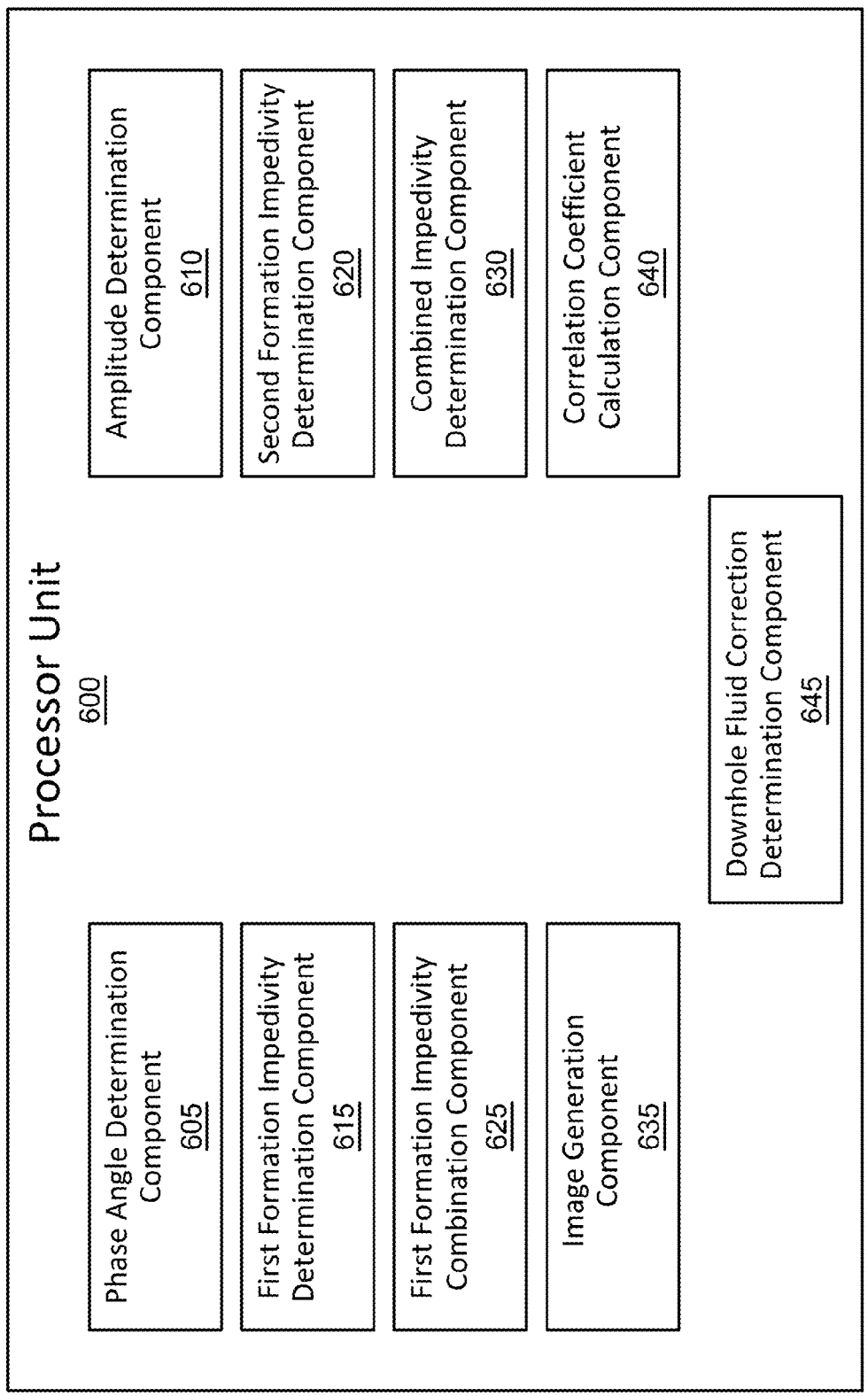
FIG. 6 is a block diagram of the processor shown in FIG. 1.

FIG. 6 is a block diagram of a processor unit 600 for obtaining a composite image of a subterranean formation. In some embodiments, the processor unit 600 may be associated with the tool disposed in the borehole, such as the tool 110 shown in FIG. 1. In other embodiments, the processor unit 600 may be associated with an above ground processor, such as the processor 120 shown in FIG. 1. In some embodiments, the processor unit 600 can be a single computer processor and in other embodiments the processor unit 600 can be made up of two or more computer processors.

The processor unit 600 can include a plurality of components including a phase angle determination component 605, an amplitude determination component 610, a first formation impedivity determination component 615, a second formation impedivity determination component 620, a first formation impedivity combination component 625, a combined impedivity determination component 630, an image generation component 635, a correlation coefficient calculation component 640, and/or a downhole fluid correction determination component 645.

The phase angle determination component 605 can be configured to determine a phase angle of the measured impedance data $Z_B$. The amplitude determination component 610 can be configured to determine an amplitude of the measured impedance data $Z_B$.

The first formation impedivity component 615 can be configured to perform a first formation impedivity determination process to determine first formation impedivity data at multiple frequencies based on a component of the measured impedance data $Z_B$ orthogonal to downhole fluid impedance data $Z_M$.

The second formation impedivity component 620 can be configured to perform a second formation impedivity determination process to determine second formation impedivity data $\zeta_{F2}$ at multiple frequencies based on an amplitude of the measured impedance data $Z_B$.

The first formation impedivity combination component 625 can be configured to combine first formation impedivity data obtained at two or more frequencies to obtain the first formation impedivity data $\zeta_{F1}$. For example, in one embodiment first formation impedivity data obtained at a first frequency can be combined with first formation impedivity data obtained at a second frequency to generate the first formation impedivity data $\zeta_{F1}$.

The combined impedivity determination component 630 can be configured to combine first formation impedivity data $\zeta_{F1}$ determined by the first formation impedivity combination component 625 with second formation impedivity data $\zeta_{F2}$ determined by the second formation impedivity determination component 620 to generate composite formation impedivity data $\zeta_C$.

The image generating component 635 can be configured to generate an electrical impedivity and/or resistivity image of a subterranean formation at different frequencies using composite formation impedivity data $\zeta_C$ determined by the combined impedivity determination component 630.

The correlation coefficient calculation component 640 can be configured to determine a correlation coefficient between first formation impedivity data $\zeta_{F1}$ determined by the first formation impedivity determination component 615 and an amplitude of the measured impedance data $Z_B$ determined by the amplitude determination component 610.

The downhole fluid correction determination component 645 can be configured to determine a downhole fluid correction value used to correct for downhole fluid formation impedivity data $\zeta_M$ when determining second formation impedivity data $\zeta_{F2}$ using the second formation impedivity determination component 620. The downhole fluid correction determination component 645 may use a correlation process and/or an inversion process to determine the downhole fluid correction.

Figure 7:
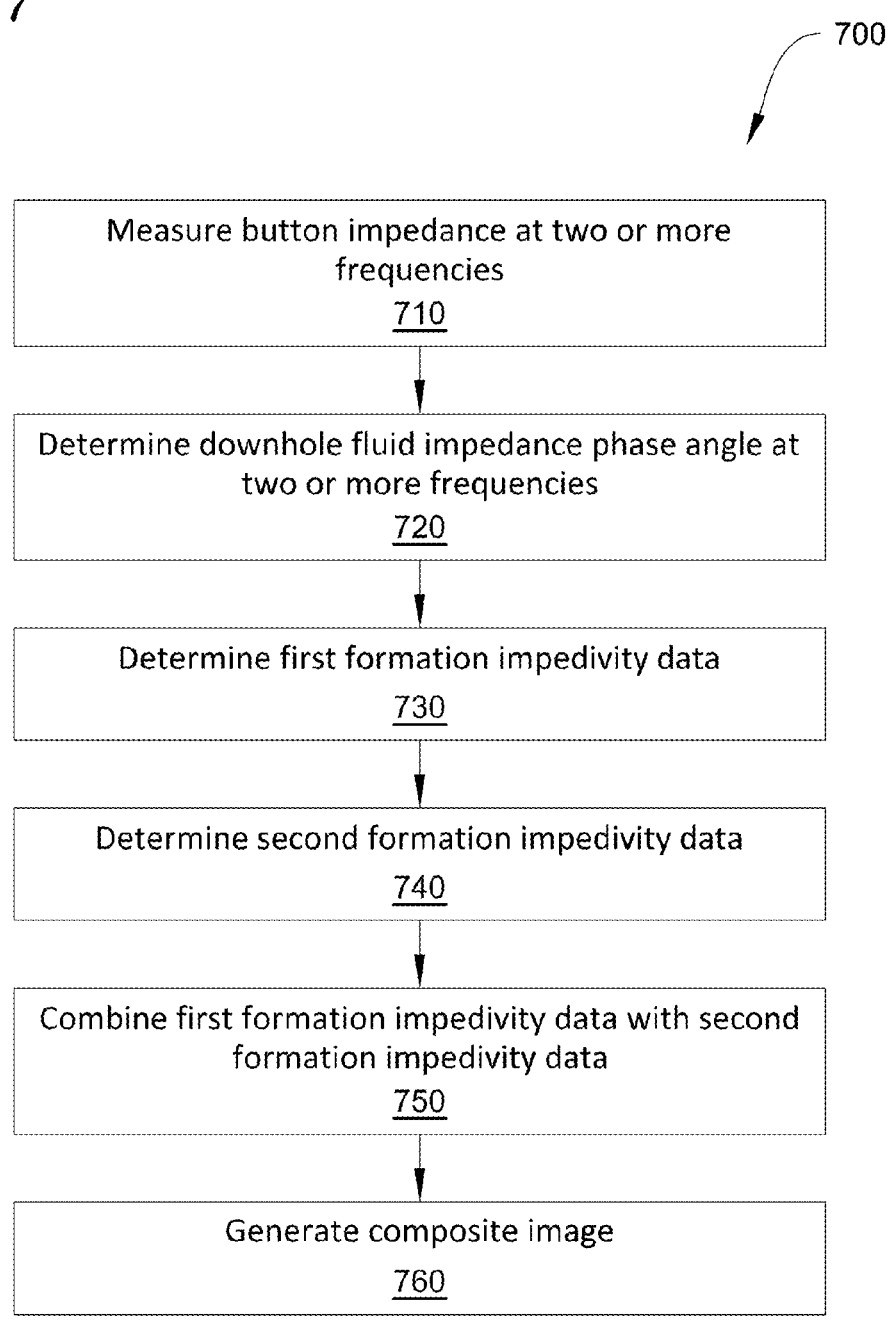
FIG. 7 is a flowchart for obtaining a composite image of a subterranean formation.

FIG. 7 is a flowchart 700 for obtaining a composite image of a subterranean formation. The flowchart 700 begins at 710 where a measurement unit in a borehole of a subterranean formation, such as the measurement unit 200 shown in FIG. 2, measures impedance data $Z_B$ seen by a button electrode of the measurement unit when a voltage V is applied between a button electrode and return electrodes of the measurement unit. The measurement unit can measure impedance data $Z_B$ when a voltage V is applied between the injector assembly and the return electrodes at two or more frequencies.

As discussed in more detail below, the frequency of the voltage V can be modified to obtain formation impedivity data $\zeta_F$ at different resistivity ranges. In one embodiment, a first frequency (i can be used to provide impedivity data $\zeta_F$ of a subterranean formation in a range, for example, between ~0.2 Ωm and ~100 Ωm and a second frequency $\omega_2$ can be used to provide impedivity data $\zeta_F$ of a subterranean formation in a range, for example, between ~10 m and ~1,000 Ωm (an impedivity of ~1,000 Ωm can correspond to a resistivity of ~10,000 Ωm for a subterranean formation at a frequency of ~5 MHz). In some embodiments, three or more frequencies can be used to obtain accurate formation impedivity data $\zeta_F$ at three or more different resistivity ranges.

At 720, one or more components of a processor, such as the processor 120 shown in FIG. 1, can determine a phase angle of the downhole impedance $\phi_M$ at two or more frequencies. As discussed above, the phase angle of the downhole impedance $\phi_M$ can be used to determine a component of the measured impedance data that is orthogonal to the downhole fluid impedance. The flowchart 700 then proceeds to 730.

At 730, one or more components of a processor, such as the processor 120 shown in FIG. 1, can determine first formation impedivity data by performing a first formation impedivity determination process. The first formation impedivity data is based on a component of the measured impedance data $Z_B$ orthogonal to downhole fluid impedance data $Z_M$ obtained at multiple frequencies using orthogonal processing. Methods and tools for determining describing orthogonal processing are described in EP Publication No. 2182391, titled "A TOOL FOR MEASURING A DOWNHOLE ENVIRONMENT". In some embodiments, the first formation impedivity determination component 615 shown in FIG. 6 can be used to determine first formation impedivity data $\zeta_{F1}$ based on a component of the measured impedance data $Z_B$ orthogonal to downhole fluid impedance data $Z_M$. One embodiment of the first formation impedivity determination process is discussed below with respect to FIG. 8.

At 740, one or more components of a processor, such as the processor 120 shown in FIG. 1, can determine second formation impedivity data $\zeta_{F2}$ by performing a second formation impedivity determination process. The second formation impedivity data is based on an amplitude of the measured impedance data $Z_B$. In some embodiments, the second formation impedivity determination component 620 shown in FIG. 6, can be used to determine second formation impedivity data $\zeta_{F2}$ based on a component of the measured impedance data $Z_B$ amplitude of the measured impedance data $Z_B$. On embodiment of the second formation impedivity determination process is discussed below with respect to FIG. 10.

At 750, one or more components of a processor, such as the processor 120 shown in FIG. 1, can combine a portion of the first formation impedivity data $\zeta_{F1}$ of a composite impedivity and/or resistivity image with a portion of the second formation impedivity data $\zeta_{F2}$ to determine combined formation impedivity data $\zeta_{FC}$. The combined formation impedivity data $\zeta_{FC}$ can be obtained by using the second formation impedivity data $\zeta_{F2}$ at subterranean formation resistivity values where the second formation impedivity data $\zeta_{F2}$ is greater than the first formation impedivity data $\zeta_{F1}$ and the second formation impedivity data $\zeta_{F2}$ is greater than a first threshold. In some embodiments, the combined impedivity determination component 630 shown in FIG. 6 can be used to determine the combined formation impedivity data $\zeta_{FC}$.

The first threshold can be determined, for example, based on a predetermined modeled response that is based on field test data and based on factors such as, for example, the specifications of the tool, the amount of noise picked up by the measurement unit, etc. As discussed above with respect to FIG. 5, orthogonal data $(Z_{90}/k_F)$ at a lower frequency (e.g., ~1 MHz), can provide values closer to $\rho_F$ for $\zeta_F$ values from ~$T_1$ to ~$T_2$. However, at some point beyond $T_2$, the orthogonal data $(Z_{90}/k_F)$ at the lower frequency can become less accurate (e.g., less than 20% accuracy), while the amplitude data $(|Z_B|/k_F)$ can provide an accurate impedivity measurement (e.g. within 20% accuracy) beyond $T_2$ up to, for example, ~1,000 $\Omega$m, which can correspond to a resistivity of ~10,000 $\Omega$m at a frequency of ~5 MHz. Thus, a first threshold can be determined within a range of values where both the orthogonal data $(Z_{90}/k_F)$ at the lower frequency and the amplitude data $(|Z_B|/k_F)$ can provide an accurate measurement (e.g., within 20% accuracy). Also, the first threshold can be selected within a range of subterranean formation resistivity values so that the first threshold can apply for a wide range of subterranean formations. In one embodiment, the first threshold can be, for example, set to a value somewhere between ~80 $\Omega$m and ~100 $\Omega$m.

Figure 13:
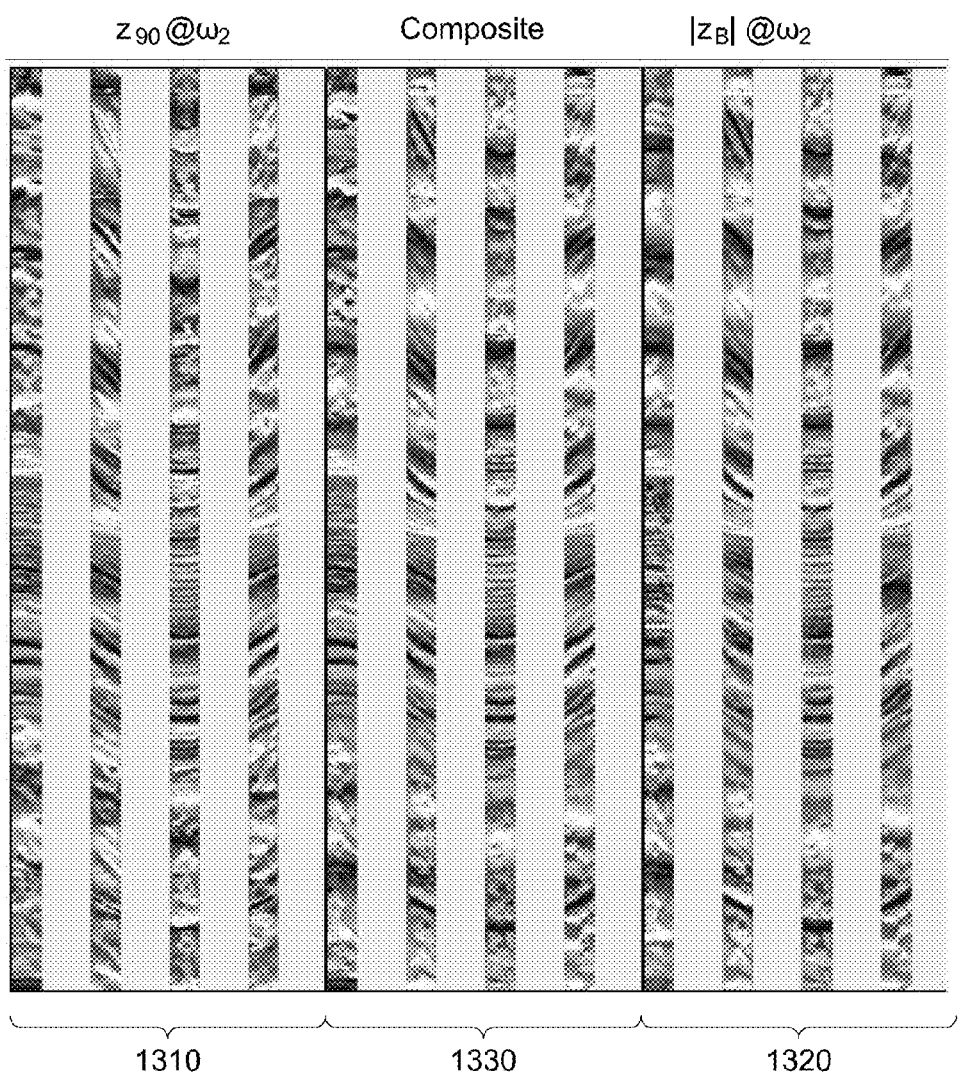
FIG. 13 is an example of a composite image generated based on the first impedivity data and the second impedivity data.

At 760, one or more components of a processor, such as the processor 120 shown in FIG. 1, can generate the composite image of the subterranean formation using the combined formation impedivity data $\zeta_{FC}$ obtained at 750. FIG. 13 shows an image 1310 generated using the first impedivity data at the second frequency $\omega_2$, an image 1320 generated using the second formation impedivity data at the second frequency $\omega_2$ and a composite impedivity and/or resistivity image 1330 combining the first formation impedivity data and second formation impedivity data along different positions within a borehole of a subterranean formation.

Figure 8:
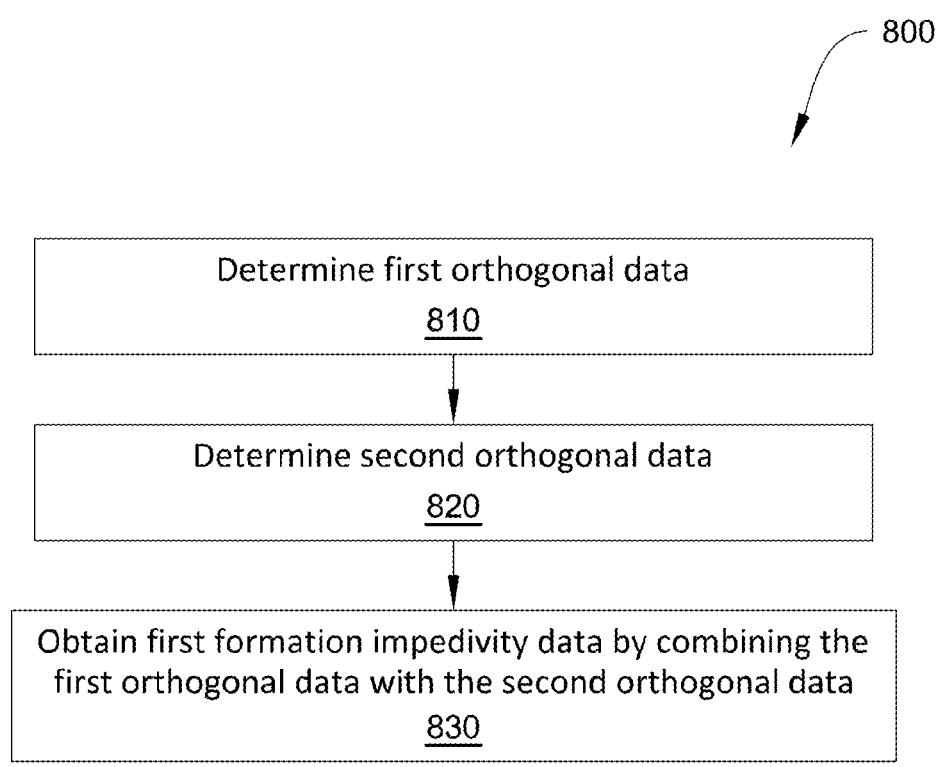
FIG. 8 is a flowchart for determining first impedivity data using a first formation impedivity determination process.

FIG. 8 provides one embodiment of a first formation impedivity determination process 800. The process 800 can determine the first formation impedivity data $\zeta_{F1}$ when impedance data measurements are measured at two frequencies ($\omega_1$ and $\omega_2$) using a first formation impedivity determination component and a first formation impedivity combination component, such as the first formation impedivity determination component 615 and the first formation impedivity combination component 625 shown in FIG. 6.

At 810, the first formation impedivity determination component can determine first orthogonal data $(Z_{90}/k_F$ at 031). The first orthogonal data can be determined by determining a component $(Z_{90})$ of the measured impedance data $Z_B$ orthogonal to downhole fluid impedance data $Z_M$ obtained at a first frequency $\omega_1$ and dividing this value by the geometric factor $k_F$ for the frequency $\omega_1$. The geometric factor $k_F$ at different frequencies can be determined as described above.

At 820, the first formation impedivity determination component can determine second orthogonal data $(Z_{90}/k_F$ at $\omega_2$). The second orthogonal data can be determined by determining a component $(Z_{90})$ of the measured impedance data $Z_B$ orthogonal to downhole fluid impedance data $Z_M$ obtained at a second frequency $\omega_2$ and dividing this value by the geometric factor $k_F$ for the frequency $\omega_2$. The flowchart 800 then proceeds to 830.

At 830, the first formation impedivity combination component can combine a portion of the first orthogonal data with a portion of the second orthogonal data to obtain first formation impedivity data $\zeta_{F1}$. The first formation impedivity data $\zeta_{F1}$ can be obtained by using the second orthogonal data at subterranean formation resistivity values where the second orthogonal data is greater than the first orthogonal data and the second orthogonal data is greater than a second threshold.

The second threshold can be determined, for example, based on a predetermined modeled response that is based on field test data and based on factors such as, for example, the specifications of the tool, the amount of noise picked up by the measurement unit, etc. As discussed above with respect to FIG. 5, orthogonal data $(Z_{90}/k_F)$ at a higher frequency (e.g., ~50 MHz), can provide values closer to $\rho_F$ with less influence on the standoff between the tool and the borehole wall, for $\zeta_F$ values up to ~$T_1$. Orthogonal data $(Z_{90}/k_F)$ at a lower frequency (e.g., ~5 MHz), can provide values closer to $\rho_F$ for $\zeta_F$ values from ~$T_1$ to ~$T_2$. Thus, two frequencies ($\omega 1$ and $\omega 2$) can be selected such that the orthogonal data at the two frequencies can overlap over a range of subterranean formation resistivity values, for example between ~2 $\Omega$m and ~10 $\Omega$m, and allow for the second threshold, determined e.g., based on field test data, to be chosen that can apply for a wide range of subterranean formations. In one embodiment, the second threshold can be, for example, set to a value somewhere between ~5 $\Omega$m and ~10 $\Omega$m.

Figure 9:
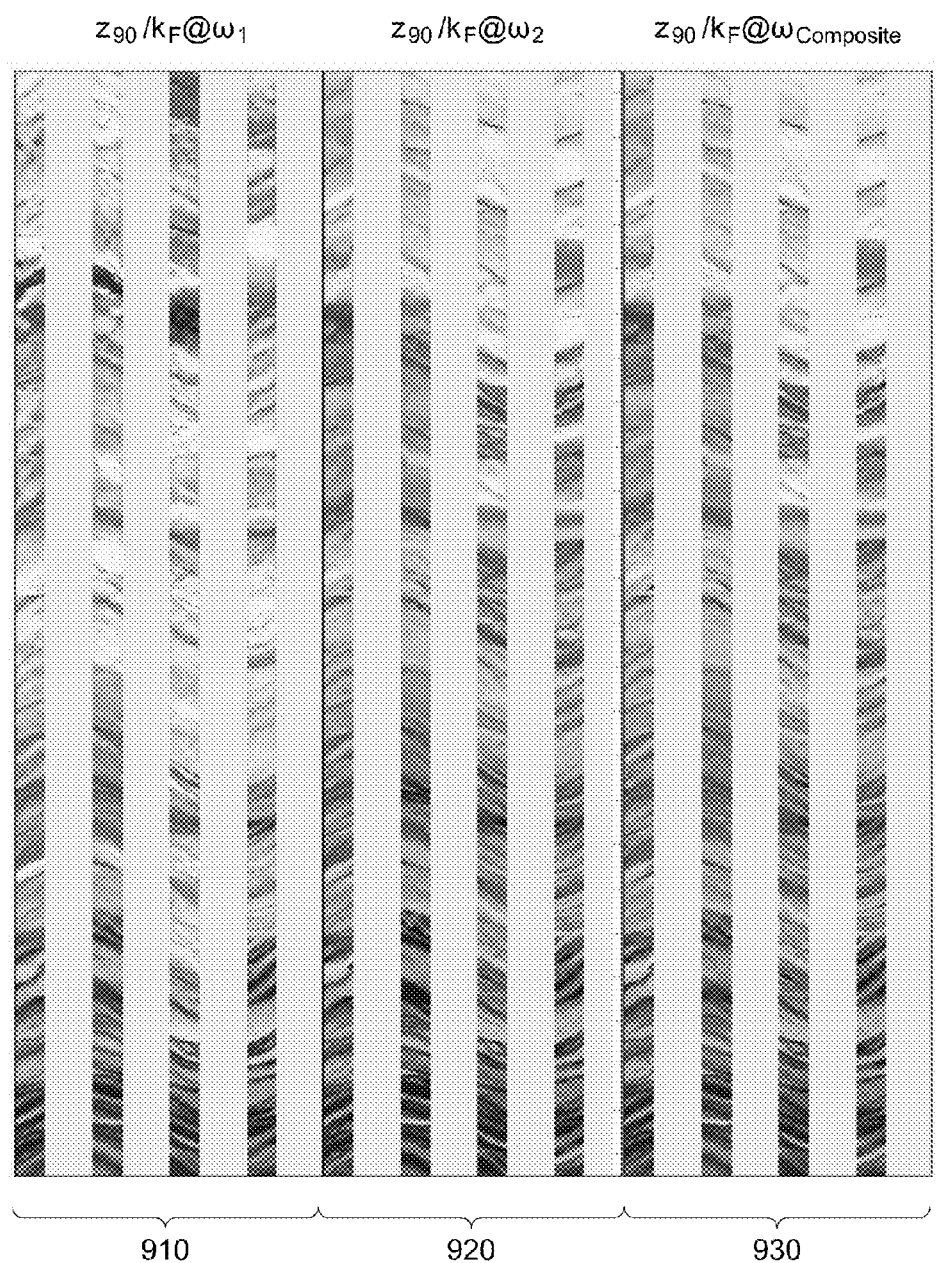
FIG. 9 is an image generated based on the first impedivity data.

FIG. 9 shows an image 910 generated using the first orthogonal data, an image 920 generated using the second orthogonal data and an image 930 generated using a composite of the first orthogonal data and the second orthogonal data along different positions within a borehole of a subterranean formation.

Figure 10:
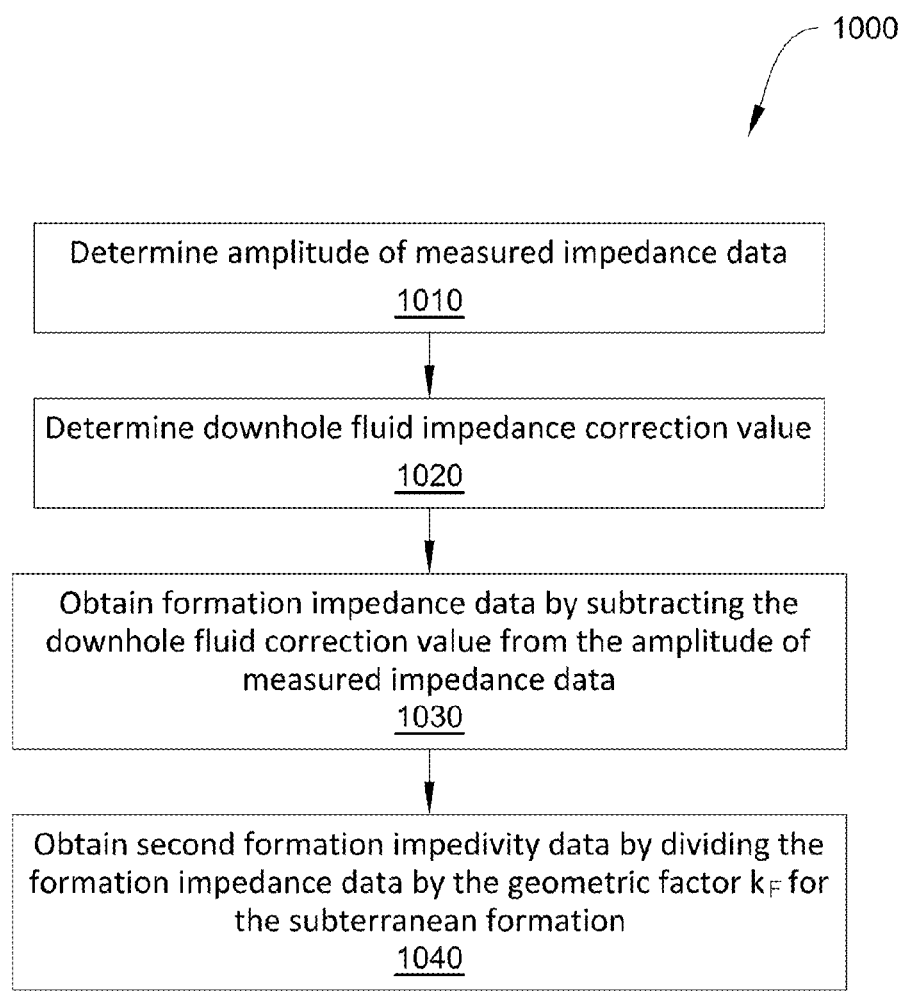
FIG. 10 is a flowchart for determining second impedivity data using a second formation impedivity determination process.

FIG. 10 provides one embodiment of a second formation impedivity determination process 1000. The process 1000 can determine the second formation impedivity data $\zeta_{F2}$ using a second formation impedivity determination component and a downhole fluid correction determination unit, such as the second formation impedivity determination component 620 and the downhole fluid correction determination unit 645 shown in FIG. 6.

At 1010, the second formation impedivity determination component can determine an amplitude of the measured impedance data $|Z_B|$. In some embodiments, the second formation impedivity determination component can use the impedance data measured at the second frequency $\omega_2$ and not the impedance data measured at the first frequency $\omega_1$ to obtain the amplitude of the measured impedance data $|Z_B|$. In other embodiments, the second formation impedivity determination component can use both the impedance data measured at the first frequency $\omega 1$ and the impedance data measured at the second frequency $\omega_2$ to obtain the amplitude of the measured impedance data $|Z_B|$. The flowchart 1000 then proceeds to 1020.

At 1020, the downhole fluid correction determination unit can determine a downhole fluid correction value $|Z_M|/k_F$.

The downhole fluid correction value can be an approximation of the amplitude of the downhole fluid impedance $Z_M$ and can be determined using a correlation process, as discussed below with respect to FIG. 11, or using an inversion process, as discussed below with respect to FIG. 12. Once the downhole fluid correction value is determined, the flowchart 1000 proceeds to 1030.

At 1030, the second formation impedivity determination component can subtract the downhole fluid correction value obtained at 1020 from the amplitude of the measured impedance data $|Z_B|$ obtained at 1010 to obtain formation impedance data $Z_F$. The flowchart 1000 then proceeds to 1040.

At 1040, the formation impedance data determined at 1030 can be divided by the geometric factor $k_F$ to obtain second formation impedivity data $\zeta_{F2}$. As discussed above, the geometric factor $k_F$ can be estimated using a variety of methods that are known to those skilled in the art.

Figure 11:
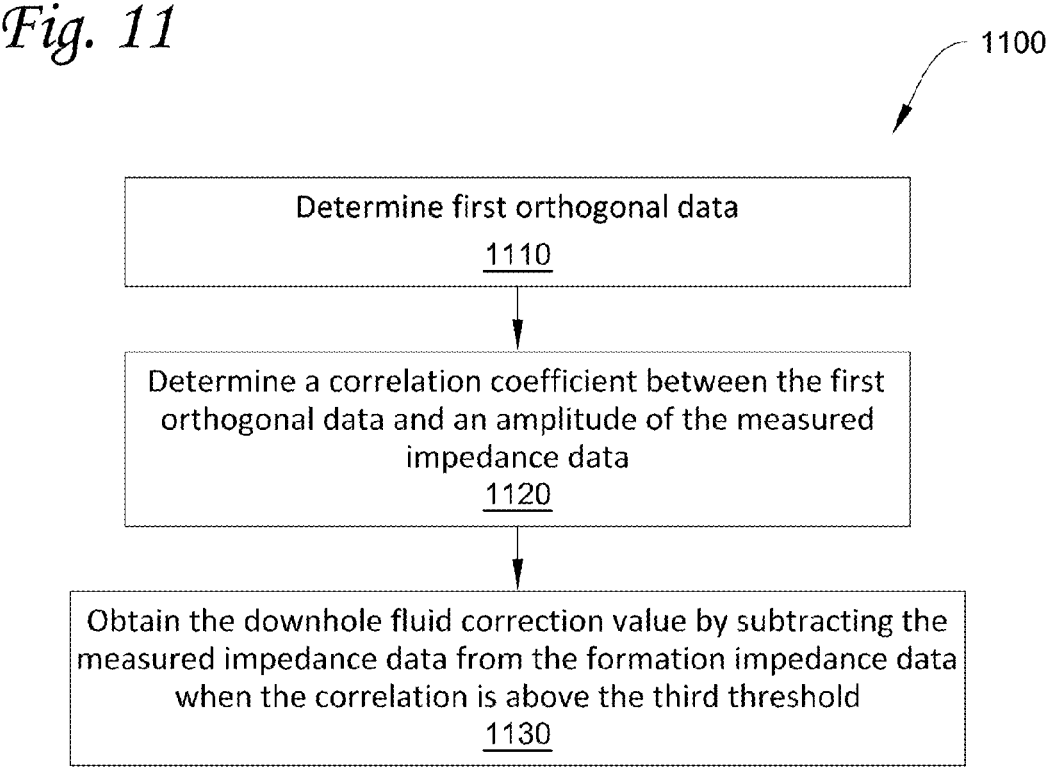
FIG. 11 is a flowchart for determining a downhole fluid correction using a correlation process.

FIG. 11 provides a flowchart 1100 for determining a downhole fluid correction value using a first formation impedivity determination component, a correlation coefficient calculation component and a downhole fluid correction determination component, such as the first formation impedivity determination component 615, the correlation coefficient calculation component 640 and the downhole fluid correction determination component 645 shown in FIG. 6.

At 1110, the first formation impedivity determination component can determine first orthogonal data ($Z_{90}/k_F$ at ω1). The first orthogonal data can be determined by determining a component ($Z_{90}$) of the measured impedance data $Z_B$ orthogonal to downhole fluid impedance data $Z_M$ obtained at a first frequency $\omega_1$ and dividing this value by the geometric factor $k_F$ for the frequency ω1.

At 1120, the correlation coefficient calculation component can determine a correlation coefficient $r_1$ between the first orthogonal data determined at 1110 and an amplitude of the measured impedance data $|Z_B|$ in a short depth interval (e.g., <~1 m). The correlation coefficient $r_1$ can be, for example, a Pearson product-moment correlation coefficient that can range from −1 to +1.

At 1130, when the correlation coefficient $r_1$ determined at 1120 is above a third threshold, the downhole fluid correction determination component can obtain the downhole fluid correction value by subtracting the measured impedance data from the formation impedance data obtained at 1130 and obtaining an amplitude of the result. In one embodiment, the third threshold can be, for example, a value between ~0.5 and ~0.7.

Figure 12:
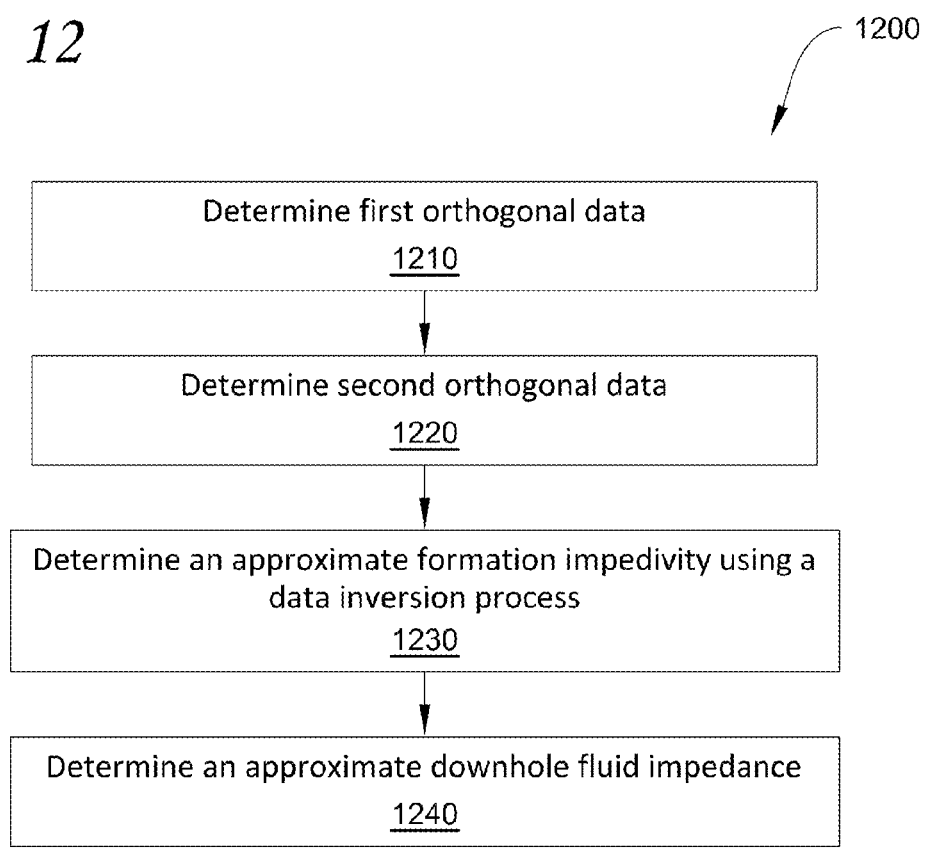
FIG. 12 is a flowchart for determining a downhole fluid correction using an inversion process.

FIG. 12 provides a flowchart 1200 for determining a downhole fluid correction value using a first formation impedivity determination component and a downhole fluid correction determination component, such as the first formation impedivity determination component 615 and the downhole fluid correction determination component 646 shown in FIG. 6.

At 1210, the first formation impedivity determination component can determine first orthogonal data ($Z_{90}/k_F$ at $\omega_1$). The first orthogonal data can be determined by determining a component ($Z_{90}$) of the measured impedance data $Z_B$ orthogonal to downhole fluid impedance data $Z_M$ obtained at a first frequency $\omega_1$ and dividing this value by the geometric factor $k_F$ for the frequency $\omega_2$.

At 1220, the first formation impedivity determination component can determine second orthogonal data ($Z_{90}/k_F$ at $\omega_2$). The second orthogonal data can be determined by determining a component ($Z_{90}$) of the measured impedance data $Z_B$ orthogonal to downhole fluid impedance data $Z_M$ obtained at a second frequency $\omega_2$ and dividing this value by the geometric factor $k_F$ for the frequency $\omega_2$.

At 1230, the downhole fluid correction determination component can determine an approximate formation impedivity from the first orthogonal data determined at 1210 and the second orthogonal data determined at 1220 using a data inversion process based on a mathematical model created using field test data. In particular, the downhole fluid correction determination component can fit the first orthogonal data and the second orthogonal data to a predetermined modeled tool response using a data inversion process.

At 1240, the downhole fluid correction determination component can determine an approximate downhole fluid impedance amplitude by subtracting the measured impedance data from the inverted formation impedivity obtained at 1230 divided by the geometric factor $k_F$. In some embodiments, to suppress the effects of factors such as noise that can impact the accuracy of determining the downhole fluid impedance amplitude, the downhole fluid correction determination component can determine an average downhole fluid impedance amplitude by applying a moving average or low-pass filter to the approximate downhole fluid impedance amplitude over a range of subterranean formation resistivity values.

The embodiments discussed above are directed to obtaining first formation impedivity data $\zeta_{F1}$ and second formation impedivity data $\zeta_{F2}$ using two frequencies. In some embodiments, impedance data $Z_B$ measured at three or more frequencies (where $\omega_1 > \omega_2 > (\omega_3)$) can be used.

In these embodiments, first formation impedivity data $\zeta_{F1}$ can be obtained by determining first orthogonal data ($Z_{90}/k_F$ at $\omega_1$), second orthogonal data ($Z_{90}/k_F$ at $\omega_2$) and third orthogonal data ($Z_{90}/k_F$ at $\omega_3$), similar to 810 and 820 of FIG. 8. The first orthogonal data can then be combined with the second orthogonal data to obtain a first composite orthogonal data, similar to 830 of FIG. 8. The first composite orthogonal data can then combined with the third orthogonal data to obtain first formation impedivity data $\zeta_{F1}$, similar to 840 in FIG. 8.

The second formation impedivity data $\zeta_{F2}$ can be determined by using the impedance data measured at the lowest frequency $\omega_3$ to obtain the amplitude of the measured impedance data $|Z_B|$. In some embodiments, the impedance data measured at the first frequency $\omega_1$ and the impedance data measured at the second frequency $\omega_2$ can also be used to obtain the amplitude of the measured impedance data $|Z_B|$.

Similarly, this methodology can be extended when impedance data is measured at four or more frequencies as well.

ASPECTS

It is noted that any of aspects 1-8 below can be combined with any of aspects 9-16.
1. A method for obtaining a composite image of a subterranean formation, the method comprising:
   measuring impedance data within a subterranean formation;
   determining first formation impedivity data by performing a first formation impedivity determination process;
   determining second formation impedivity data by performing a second formation impedivity determination process;
   combining a portion of the first formation impedivity data with a portion of the second formation impedivity data to determine combined formation impedivity data; and generating the composite image using the combined formation impedivity data.

2. The method of aspect 1, further comprising:
determining combined formation impedivity data by using the second formation impedivity data at subterranean formation resistivity values where the second formation impedivity data is greater than the first formation impedivity data and is greater than a first threshold.

3. The method of any of aspects 1-2, wherein the second formation impedivity data is based on an amplitude of the measured impedance data, and the second formation impedivity determination process includes:
determining an amplitude of the measured impedance data;
determining a downhole fluid correction value; and
subtracting the downhole fluid correction value from the amplitude of the measured impedance data.

4. The method of any of aspects 1-3, wherein measuring the impedance data includes measuring the impedance data at a first frequency and measuring the impedance data at a second frequency that is lower than the first frequency; and
wherein the first formation impedivity data is based on a component of the measured impedance data orthogonal a downhole fluid impedance and the first formation impedivity determination process includes:
determining first orthogonal data based on an orthogonal component of the impedance data measured at the first frequency,
determining second orthogonal data based on an orthogonal component of the impedance data measured at the second frequency, and
combining the first orthogonal data with the second orthogonal data by using the second orthogonal data at subterranean formation resistivity values where the second orthogonal data is greater than the first orthogonal data and is greater than a second threshold.

5. The method of aspect 3, wherein measuring the impedance data includes measuring the impedance data at a first frequency and measuring the impedance data at a second frequency that is lower than the first frequency; and
wherein determining the amplitude of the measured impedance data includes using an amplitude of the impedance data measured at the second frequency.

6. The method of aspect 3, wherein the downhole fluid correction value is determined using a correlation process that includes:
determining orthogonal data based on an orthogonal component of the measured impedance data,
determining an amplitude of the measured impedance data,
determining a correlation coefficient between the orthogonal data and the amplitude, and
subtracting the orthogonal data from the amplitude when the correlation coefficient is greater than a third threshold to obtain the downhole fluid correction value.

7. The method of aspect 3, wherein measuring the impedance data includes measuring the impedance data at a first frequency and at a second frequency that is lower than the first frequency; and
wherein the downhole fluid correction value is obtained using an inversion process that includes:
determining first orthogonal data using the impedance data measured at the first frequency,
determining second orthogonal data using the impedance data measured at the second frequency,
determining an amplitude of the impedance data measured at the second frequency,
inverting the first orthogonal data and the second orthogonal data to obtain inverted formation impedivity data, and
subtracting the inverted formation impedivity data from the amplitude of the impedance data measured at the second frequency to obtain the downhole fluid correction value.

8. The method of any of aspects 1-3 and 5-7, wherein measuring the impedance data includes measuring the impedance data at a first frequency, measuring the impedance data at a second frequency that is lower than the first frequency, and measuring the impedance data at a third frequency that is lower than the second frequency;
wherein the first formation impedivity data is based on a component of the measured impedance data orthogonal a downhole fluid impedance and the first formation impedivity determination process includes:
determining first orthogonal data based on an orthogonal component of the impedance data measured at the first frequency,
determining second orthogonal data based on an orthogonal component of the impedance data measured at the second frequency,
determining third orthogonal data based on an orthogonal component of the impedance data measured at the third frequency,
combining the first orthogonal data with the second orthogonal data to obtain first composite orthogonal data, and
combining the first composite orthogonal data with the third orthogonal data to obtain the first formation impedivity data; and
wherein the second formation impedivity data is based on an amplitude of the measured impedance data, and the second formation impedivity determination process includes:
determining an amplitude of the impedance data measured at the third frequency,
determining a downhole fluid correction value, and
subtracting the downhole fluid correction from the amplitude of the impedance data measured at the third frequency.

9. A system for obtaining a composite image of a subterranean formation, the system comprising:
a tool for investigating a subterranean formation;
a measurement unit disposed on the tool, the measurement unit adapted to measure impedance data from the subterranean formation; and
a processor connected to the measurement unit, the processor including one or more components adapted to:
perform a first formation impedivity determination process to determine first formation impedivity data,
perform a second formation impedivity determination process to determine second formation impedivity data,
combine a portion of the first formation impedivity data with a portion of the second formation impedivity data to determine combined formation impedivity data, and
generate the composite image of the subterranean formation using the combined formation impedivity data.

10. The system of aspect 9, wherein the one or more components of the processor are further adapted to determine combined formation impedivity data by using the second formation impedivity data at subterranean formation resistivity values where the second formation impedivity data is greater than the first formation impedivity data and is greater than a first threshold.

11. The system of any of aspects 9-10, wherein the second formation impedivity data is based on an amplitude of the measured impedance data; and
wherein to perform the second formation impedivity determination process, the one or more components of the processor are further adapted to:
determine an amplitude of the measured impedance data,
determine a downhole fluid correction value, and
subtract the downhole fluid correction value from the amplitude of the measured impedance data.

12. The system of any of aspects 9-11, the measurement unit is further adapted to measure impedance data at a first frequency and a second frequency that is lower than the first frequency;
wherein the first formation impedivity data is based on a component of the measured impedance data orthogonal a downhole fluid impedance; and
wherein to perform the first formation impedivity determination process, the one or more components of the processor are further adapted to:
determine first orthogonal data based on an orthogonal component of the impedance data measured at the first frequency,
determine second orthogonal data based on an orthogonal component of the impedance data measured at the second frequency, and
combine the first orthogonal data with the second orthogonal data by using the second orthogonal data at subterranean formation resistivity values where the second orthogonal data is greater than the first orthogonal data and is greater than a second threshold.

13. The system of aspect 11, wherein the measurement unit is further adapted to measure impedance data at a first frequency and a second frequency that is lower than the first frequency; and
wherein to perform the second formation impedivity determination process, the one or more components of the processor are further adapted to:
use an amplitude of the impedance data measured at the second frequency to determine the amplitude of the measured impedance data.

14. The system of aspect 11, wherein the measurement unit is further adapted to measure impedance data at a first frequency and a second frequency; and
wherein to determine the downhole fluid correction value the one or more components of the processor are further adapted to:
determine orthogonal data based on an orthogonal component of the measured impedance data,
determine an amplitude of the measured impedance data,
determine a correlation coefficient between the orthogonal data and the amplitude, and
subtract the orthogonal data from the amplitude when the correlation coefficient is greater than a third threshold to obtain the downhole fluid correction value.

15. The system of aspect 11, wherein the measurement unit is further adapted to measure impedance data at a first frequency and a second frequency that is lower than the first frequency; and
wherein to determine the downhole fluid correction value the one or more components of the processor are further adapted to:
determine first orthogonal data using the impedance data measured at the first frequency,
determine second orthogonal data using the impedance data measured at the second frequency,
determine an amplitude of the impedance data measured at the second frequency,
invert the first orthogonal data and the second orthogonal data to obtain inverted formation impedivity data, and
subtract the inverted formation impedivity data from the amplitude of the impedance data measured at the second frequency to obtain the downhole fluid correction value.

16. The system of any of aspects 9-11 and 13-15, wherein the measurement unit is further adapted to measure the impedance data at a first frequency, at a second frequency that is lower than the first frequency, and at a third frequency that is lower than the second frequency;
wherein the first formation impedivity data is based on a component of the measured impedance data orthogonal a downhole fluid impedance and the second formation impedivity data is based on an amplitude of the measured impedance data;
wherein to perform the first formation impedivity determination process, the one or more components of the processor are further adapted to:
determine first orthogonal data based on an orthogonal component of the impedance data measured at the first frequency,
determine second orthogonal data based on an orthogonal component of the impedance data measured at the second frequency,
determine third orthogonal data based on an orthogonal component of the impedance data measured at the third frequency,
combine the first orthogonal data with the second orthogonal data to obtain first composite orthogonal data, and
combine the first composite orthogonal data with the third orthogonal data to obtain the first formation impedivity data; and
wherein to perform the second formation impedivity determination process, the one or more components of the processor are further adapted to:
determine an amplitude of the impedance data measured at the third frequency;
determine a downhole fluid correction value; and
subtract the downhole fluid correction from the amplitude of the impedance data measured at the third frequency.

The invention claimed is:
1. A method for obtaining a composite image of a subterranean formation, the method comprising:
measuring impedance data within the subterranean formation;
determining first formation impedivity data by performing a first formation impedivity determination process based on a component of the measured impedance data orthogonal to a downhole fluid impedance data;
determining second formation impedivity data by performing a second formation impedivity determination process based on the amplitude of the measured impedance data;
combining a portion of the first formation impedivity data with a portion of the second formation impedivity data to determine combined formation impedivity data, wherein determining the combined formation impedivity data by using the second formation impedivity data at subterranean formation resistivity values where the second formation impedivity data is greater than the first formation impedivity data and is greater than a first threshold; and generating the composite image using the combined formation impedivity data.

2. The method of claim 1, wherein the second formation impedivity determination process includes:
   determining the amplitude of the measured impedance data;
   determining a downhole fluid correction value; and
   subtracting the downhole fluid correction value from the amplitude of the measured impedance data.

3. The method of claim 2, wherein measuring the impedance data includes measuring the impedance data at a first frequency and measuring the impedance data at a second frequency that is lower than the first frequency; and
   wherein determining the amplitude of the measured impedance data includes using an amplitude of the impedance data measured at the second frequency.

4. The method of claim 2, wherein the downhole fluid correction value is determined using a correlation process that includes:
   determining orthogonal data based on an orthogonal component of the measured impedance data,
   determining the amplitude of the measured impedance data,
   determining a correlation coefficient between the orthogonal data and the amplitude, and
   subtracting the orthogonal data from the amplitude when the correlation coefficient is greater than a third threshold to obtain the downhole fluid correction value.

5. The method of claim 2, wherein measuring the impedance data includes measuring the impedance data at a first frequency and at a second frequency that is lower than the first frequency; and
   wherein the downhole fluid correction value is obtained using an inversion process that includes:
   determining first orthogonal data using the impedance data measured at the first frequency,
   determining second orthogonal data using the impedance data measured at the second frequency,
   determining an amplitude of the impedance data measured at the second frequency,
   inverting the first orthogonal data and the second orthogonal data to obtain inverted formation impedivity data, and
   subtracting the inverted formation impedivity data from the amplitude of the impedance data measured at the second frequency to obtain the downhole fluid correction value.

6. The method of claim 1, wherein measuring the impedance data includes measuring the impedance data at a first frequency and measuring the impedance data at a second frequency that is lower than the first frequency; and
   wherein the first formation impedivity determination process includes:
   determining first orthogonal data based on an orthogonal component of the impedance data measured at the first frequency,
   determining second orthogonal data based on an orthogonal component of the impedance data measured at the second frequency, and
   combining the first orthogonal data with the second orthogonal data by using the second orthogonal data at subterranean formation resistivity values where the second orthogonal data is greater than the first orthogonal data and is greater than a second threshold.

7. The method of claim 1, wherein measuring the impedance data includes measuring the impedance data at a first frequency, measuring the impedance data at a second frequency that is lower than the first frequency, and measuring the impedance data at a third frequency that is lower than the second frequency;
   wherein the first formation impedivity determination process includes:
   determining first orthogonal data based on an orthogonal component of the impedance data measured at the first frequency,
   determining second orthogonal data based on an orthogonal component of the impedance data measured at the second frequency,
   determining third orthogonal data based on an orthogonal component of the impedance data measured at the third frequency,
   combining the first orthogonal data with the second orthogonal data to obtain first composite orthogonal data, and
   combining the first composite orthogonal data with the third orthogonal data to obtain the first formation impedivity data; and
   wherein the second formation impedivity data is based on an amplitude of the measured impedance data, and the second formation impedivity determination process includes:
   determining an amplitude of the impedance data measured at the third frequency,
   determining a downhole fluid correction value, and
   subtracting the downhole fluid correction from the amplitude of the impedance data measured at the third frequency.

8. The method of claim 1, wherein the composite image is based on a composite of a first and a second image that varies monotonically with formation resistivity.

9. A system for obtaining a composite image of a subterranean formation, the system comprising:
   a tool for investigating a subterranean formation;
   a measurement unit disposed on the tool, the measurement unit adapted to measure impedance data from the subterranean formation; and
   a processor connected to the measurement unit, the processor including one or more components adapted to:
   perform a first formation impedivity determination process to determine first formation impedivity data based on a component of the measured impedance data orthogonal to a downhole fluid impedance data;
   perform a second formation impedivity determination process to determine second formation impedivity data based on the amplitude of the measured impedance data,
   combine a portion of the first formation impedivity data with a portion of the second formation impedivity data to determine combined formation impedivity data, wherein the one or more components of the processor are further adapted to determine the combined formation impedivity data by using the second formation impedivity data at subterranean formation resistivity values where the second formation impedivity data is greater than the first formation impedivity data and is greater than a first threshold and
   generate the composite image of the subterranean formation using the combined formation impedivity data.

10. The system of claim 9, wherein
   wherein to perform the second formation impedivity determination process, the one or more components of the processor are further adapted to:

determine the amplitude of the measured impedance data,
determine a downhole fluid correction value, and
subtract the downhole fluid correction value from the amplitude of the measured impedance data.

11. The system of claim 10, wherein the measurement unit is further adapted to measure impedance data at a first frequency and a second frequency that is lower than the first frequency; and
wherein to perform the second formation impedivity determination process, the one or more components of the processor are further adapted to:
use an amplitude of the impedance data measured at the second frequency to determine the amplitude of the measured impedance data.

12. The system of claim 10, wherein the measurement unit is further adapted to measure impedance data at a first frequency and a second frequency; and
wherein to determine the downhole fluid correction value the one or more components of the processor are further adapted to:
determine orthogonal data based on an orthogonal component of the measured impedance data,
determine the amplitude of the measured impedance data,
determine a correlation coefficient between the orthogonal data and the amplitude, and
subtract the orthogonal data from the amplitude when the correlation coefficient is greater than a third threshold to obtain the downhole fluid correction value.

13. The system of claim 10, wherein the measurement unit is further adapted to measure impedance data at a first frequency and a second frequency that is lower than the first frequency; and
wherein to determine the downhole fluid correction value the one or more components of the processor are further adapted to:
determine first orthogonal data using the impedance data measured at the first frequency,
determine second orthogonal data using the impedance data measured at the second frequency,
determine an amplitude of the impedance data measured at the second frequency,
invert the first orthogonal data and the second orthogonal data to obtain inverted formation impedivity data, and
subtract the inverted formation impedivity data from the amplitude of the impedance data measured at the second frequency to obtain the downhole fluid correction value.

14. The system of any of claim 9, the measurement unit is further adapted to measure impedance data at a first frequency and a second frequency that is lower than the first frequency;
wherein to perform the first formation impedivity determination process, the one or more components of the processor are further adapted to:
determine first orthogonal data based on an orthogonal component of the impedance data measured at the first frequency,
determine second orthogonal data based on an orthogonal component of the impedance data measured at the second frequency, and
combine the first orthogonal data with the second orthogonal data by using the second orthogonal data at subterranean formation resistivity values where the second orthogonal data is greater than the first orthogonal data and is greater than a second threshold.

15. The system of claim 9, wherein the measurement unit is further adapted to measure the impedance data at a first frequency, at a second frequency that is lower than the first frequency, and at a third frequency that is lower than the second frequency;
wherein to perform the first formation impedivity determination process, the one or more components of the processor are further adapted to:
determine first orthogonal data based on an orthogonal component of the impedance data measured at the first frequency,
determine second orthogonal data based on an orthogonal component of the impedance data measured at the second frequency,
determine third orthogonal data based on an orthogonal component of the impedance data measured at the third frequency,
combine the first orthogonal data with the second orthogonal data to obtain first composite orthogonal data, and
combine the first composite orthogonal data with the third orthogonal data to obtain the first formation impedivity data; and
wherein to perform the second formation impedivity determination process, the one or more components of the processor are further adapted to:
determine an amplitude of the impedance data measured at the third frequency;
determine a downhole fluid correction value; and
subtract the downhole fluid correction from the amplitude of the impedance data measured at the third frequency.

16. The system of claim 9, wherein the composite image is based on a composite of a first and a second image that varies monotonically with formation resistivity.

* * * * *